US009448668B2

United States Patent
Xie et al.

(10) Patent No.: US 9,448,668 B2
(45) Date of Patent: Sep. 20, 2016

(54) TOUCH PANEL AND MANUFACTURING METHOD THEREOF

(75) Inventors: Yanjun Xie, Wuhan (CN); Yau-Chen Jiang, Zhubei (TW); Bixin Guan, Xiamen (CN)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 30 days.

(21) Appl. No.: 13/598,620

(22) Filed: Aug. 30, 2012

(65) Prior Publication Data

US 2013/0106743 A1    May 2, 2013

(30) Foreign Application Priority Data

Oct. 26, 2011  (CN) .......................... 2011 1 0335557

(51) Int. Cl.
*G06F 3/041* (2006.01)
*G06F 3/044* (2006.01)

(52) U.S. Cl.
CPC ..... *G06F 3/044* (2013.01); *G06F 2203/04103* (2013.01); *Y10T 29/49105* (2015.01)

(58) Field of Classification Search
CPC ........ G06F 3/041; G06F 3/044; G06F 3/416; G06F 2203/04103; Y10T 29/49105
USPC ........ 345/173–174; 178/18.01, 18.03, 18.06; 324/668, 754.28, 658, 519; 29/592.1, 29/622

See application file for complete search history.

(56) References Cited

U.S. PATENT DOCUMENTS

| 2011/0048812 | A1  | 3/2011 | Yilmaz |
| 2011/0062969 | A1* | 3/2011 | Hargreaves et al. .......... 324/658 |
| 2012/0062469 | A1* | 3/2012 | Guard ........................... 345/173 |

FOREIGN PATENT DOCUMENTS

| CN | 101566895 A | 10/2009 |
| CN | 101937278 A | 1/2011 |

* cited by examiner

*Primary Examiner* — Alexander Eisen
*Assistant Examiner* — Abhishek Sarma
(74) *Attorney, Agent, or Firm* — Chen Yoshimura LLP (57) ABSTRACT

A touch panel comprises of a plurality of first strip sensing electrodes and a plurality of second strip sensing electrodes. The first strip sensing electrodes are respectively disposed in a plurality of strip sensing regions with fixed lengths, and each of the second strip sensing electrodes is disposed corresponding to each of the first strip sensing electrodes in each of the strip sensing regions. Each second strip sensing electrode and corresponding first strip sensing electrode are electrically disconnected from each other. Length of each second strip sensing electrode and length of the corresponding first strip sensing electrode are complementary to each other. In one embodiment of the present disclosure, a method for manufacturing the touch panel is also disclosed.

17 Claims, 7 Drawing Sheets

TOUCH PANEL AND MANUFACTURING METHOD THEREOF

This application claims the benefit of Chinese application No. 201110335557.7, filed on Oct. 26, 2011.

BACKGROUND OF THE INVENTION

1. Field of the Invention

The present disclosure relates to an input interface and more particularly to a touch panel and a method of the same.

2. Description of the Related Art

Touch panels have been extensively used as exterior input interfaces on account of their characteristic of man-machine interaction. In recent years, with the scope of electronic products becoming wider, products that involve integrating touch functions with display to form a touch display panel have significantly increased, specially in products such as mobile phones, GPS navigator systems, tablet PC's, personal digital assistants, laptop PC's and the like.

At present a number of touch panel technologies are available. Most common technology used in a small portable electronic device includes resistive type touch panels, capacitive type touch panels and the like, wherein the operational principle in such touch panels includes using transparent sensing electrodes to detect voltage or capacitance changes of the position of touch points, and utilizing connecting wires connected with each transparent electrode on the different direction axes to transfer signals back and finish orientation. In known touch panel technologies, there are a variety of sensing electrode designs, wherein one of the designs adopts a rhombic sensing pad as a sensing electrode to connect each sensing electrode located on the same axis in series by the connecting wires with less width than sensing electrode, and an insulating material is generally formed between the connecting wires that are located on same axis to prevent the signals from interfering with each other. However, this causes complication in the manufacturing process.

SUMMARY OF THE INVENTION

An objective of the present disclosure is to provide a touch panel and a process for manufacturing the same, wherein the touch panel utilizes a method that enables each sensing electrode of the panel to be electrically separated from each other and change the length collocation of each sensing electrode pattern to simplify the manufacturing process.

To achieve the foregoing objective, another embodiment of the present disclosure provides a touch panel including a plurality of first strip sensing electrodes and a plurality of second strip sensing electrodes. The first strip sensing electrodes are respectively disposed in a plurality of strip sensing regions with fixed lengths. Each of the second strip sensing electrodes is disposed in each of the strip sensing regions to correspond to each of the first sensing electrodes. Each of the second strip sensing electrodes and the corresponding first strip sensing electrode are electrically disconnected from each other, and the lengths thereof are complementary to each other.

To achieve the foregoing objective, another embodiment of the present disclosure provides a method of manufacturing the touch panel, which includes respectively forming a first strip sensing electrode in a plurality of strip sensing regions with fixed lengths and respectively forming a second strip sensing electrode in each strip sensing region. The second strip sensing electrode and the first strip sensing electrode in each strip sensing region are disposed correspondingly. Each of the second strip sensing electrodes and the corresponding first strip sensing electrode are electrically disconnected from each other, and the lengths thereof are complementary to each other.

In another embodiment of the present disclosure, required touch recognition effect can be achieved when each sensing electrode is electrically separated from each other and there is a change in the length of each sensing electrode pattern. Meanwhile, since each sensing electrode is electrically separated from others, design and manufacture of the connecting wires and insulating materials between each sensing electrode can be omitted, so that the manufacturing method is simplified.

DETAILED DESCRIPTION OF THE EMBODIMENTS

Specific components are indicated by certain terms in the present description and following claims. It is comprehensible to those skills in the art that manufacturer may use different terms to indicate same components. The present description and following claims are not intended to use the difference of terms as the way to distinguish components, but use the functional difference of components as distinguishing benchmark. Term "include" referred in whole description and following claims is an open expression, it is explained as "including but not limited to". Furthermore, to those skills in the art of the present invention can further understand the present invention, certain embodiments of the present invention accompanying with drawings are described in detail below. Be noted that the drawings are for the purpose of description only, not for charting in accordance with original dimension. In addition, used terms such as "first", "second" and the like in the description are used for distinguishing different components and not limiting the orders.

Figure 1:
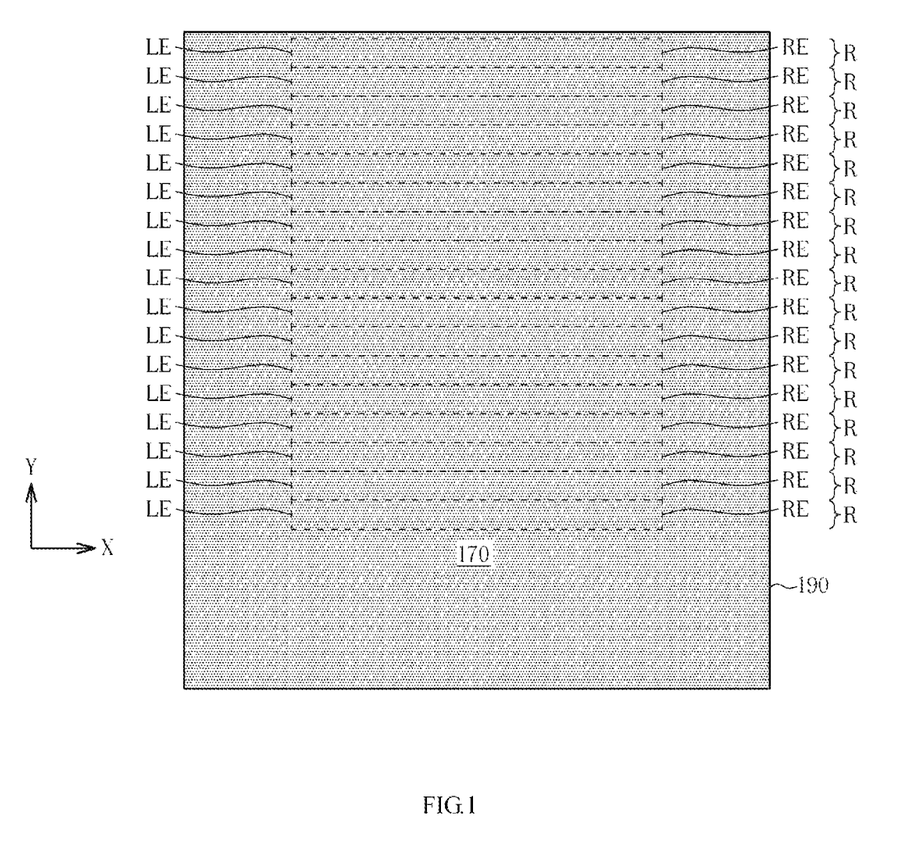
FIG. 1 to FIG. 4 illustrates a diagram of a method of manufacturing a touch panel according to an embodiment of the present disclosure.
Figure 2:
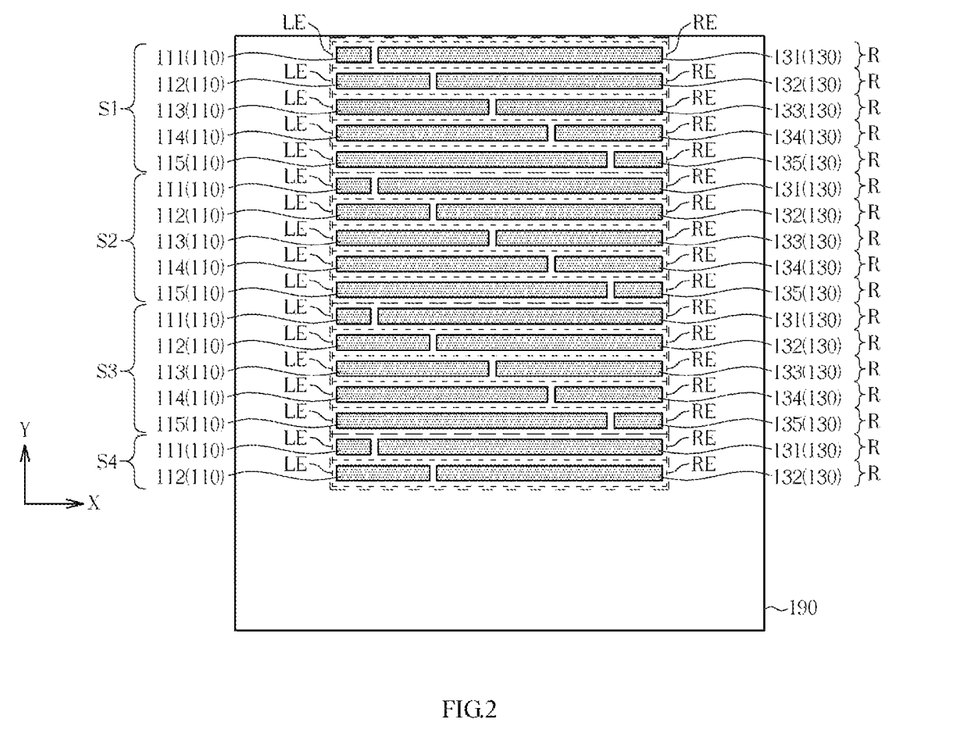
Figure 3:
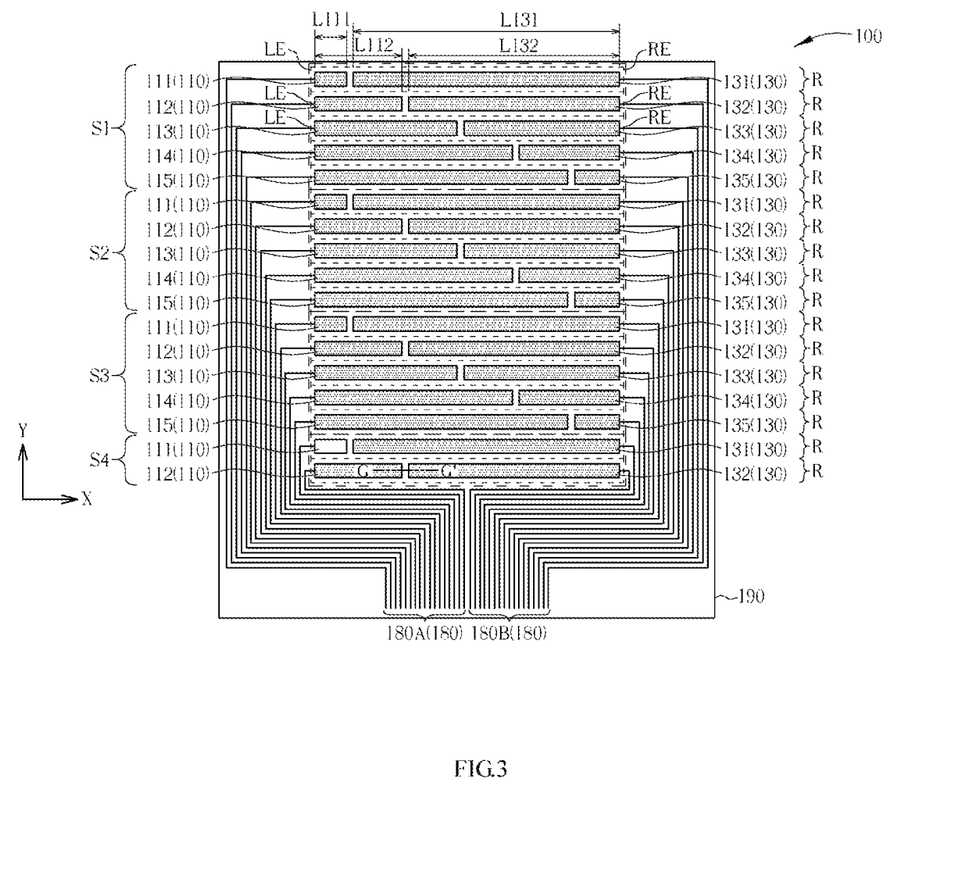
Figure 4:
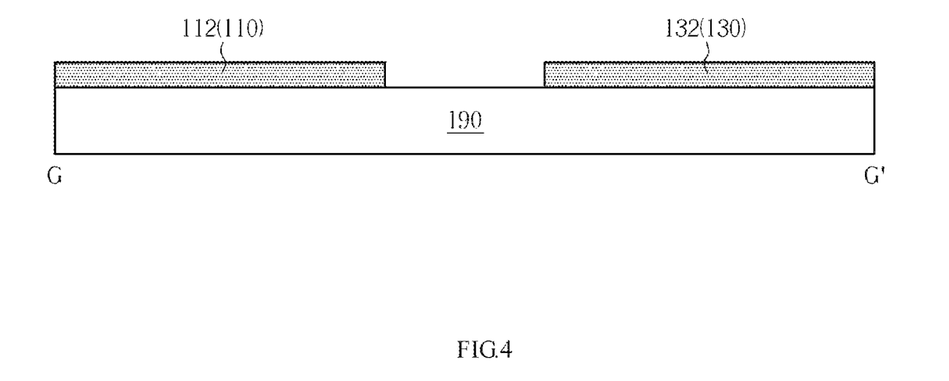

With reference to FIG. 1 to FIG. 4, the figures illustrate a method of manufacturing a touch panel according to an embodiment of the present disclosure. Wherein FIG. 1, FIG. 2 and FIG. 3 are top plan views, FIG. 4 is a cross-section view of G-G' section line along FIG. 3. To facilitate the description, each figure of the present disclosure is only illustrated for easier understanding the present disclosure, the detailed proportion thereof may be adjusted to meet design requirement. As shown in FIG. 1 to FIG. 4, the method of manufacturing a touch panel in accordance with a better embodiment of the present disclosure includes following steps. Firstly as shown in FIG. 1, a method for providing a substrate 190. The substrate 190 is provided with a plurality of strip sensing regions R with fixed lengths extending along a first direction X, wherein adjacent strip sensing regions R are aligned along a second direction Y. In other words, the strip sensing regions R are disposed on the substrate 190. In an embodiment of the present disclosure, the first direction X can be perpendicular to the second direction Y. Each of the strip sensing regions R has a first terminal LE and a second terminal RE corresponding to the first terminal LE in the first direction X. The substrate 190 of the present embodiment can include hard substrates such as glass substrate or ceramal substrate, flexible substrate such as plastic substrate or other applicable material substrate. Further the method involves forming a conducting layer 170 on the substrate 190. In an embodiment of the present disclosure, the conducting layer 170 can include transparent conducting materials, such as indium tin oxide (ITO), indium zinc oxide (IZO) and aluminum zinc oxide (AZO) or other applicable opaque conducting material, such as silver, aluminum, copper, magnesium, molybdenum, composite layer of foregoing materials or alloy of foregoing materials, but not limited to the present. Once the conducting layer 170 is formed, a patterning process can be performed on the conducting layer 170, as shown in FIG. 2, wherein the first terminal LE of each strip sensing region R is respectively formed with a first strip sensing electrode 110, while the second terminal RE of each strip sensing region R is respectively formed with a second strip sensing electrode 130. In the present embodiment the first strip sensing electrode 110 and the second strip sensing electrode 130 can be simultaneously formed by same patterning process. However, the present disclosure is not limited to the present process and the first strip sensing electrode 110 and the second strip sensing electrode 130 can be formed by utilizing different patterning processes. Each of the first strip sensing electrodes 110 extends along a direction from the first terminal LE forward the second terminal RE of each of the strip sensing regions R, and each of the second strip sensing electrodes 130 extends along a direction from the second terminal RE forward the first terminal LE of each of the strip sensing regions R. In other words, each of the first strip sensing electrodes 110 is disposed correspondingly to each of the strip sensing regions R with fixed lengths, and each of the second strip sensing electrodes 130 is disposed correspondingly to each of the first strip sensing electrodes 110 in each of the strip sensing regions R. The first strip sensing electrode 110 and the corresponding second strip sensing electrode 130 in each strip sensing region R are electrically disconnected from each other, and the lengths thereof are complementary to each other. Further, as shown in FIG. 3, a peripheral wire layer 180 is formed on the substrate 190. In an embodiment of the present disclosure, the peripheral wire layer 180 may include transparent conducting materials such as indium tin oxide (ITO), indium zinc oxide (IZO) and aluminum zinc oxide (AZO) or other applicable opaque conducting material, such as silver, aluminum, copper, magnesium, molybdenum, composite layer of foregoing materials or alloy of foregoing materials, but not limited. Further, a manufacturing process such as a photolithography etching process can be performed on the peripheral wire layer 180 to form a plurality of first wires 180A and a plurality of second wires 180B. However, the present disclosure is not limited, and it may utilize other manufacturing process such as a lift of process to form the first wires 180A and the second wires 180B as required. Each of the first wires 180A can be electrically connected to each of the first strip sensing electrodes 110 on the first terminal LE of each of the strip sensing region R, and each of the second wires 180B can be electrically connected to each of the second strip sensing electrodes 130 on the second terminal RE of each of the strip sensing regions R. By virtue of foregoing manufacturing method touch panel 100 shown in FIG. 3 can be completed. It is worth explaining that, in the present disclosure, patterning process can include a photolithography process with photo mask and an etching process. However, the present disclosure is not limited, and it may utilize other method such as the lift-off process for patterning. Moreover, the method of manufacturing the touch panel in accordance with the present embodiment further include forming a protective layer (not shown) to cover the substrate 190, each that sensing electrode 110, each second sensing electrode 130, each first wire 180A and each second wire 180B, so as to achieve the effect of preventing environmental impacts.

In another embodiment of the present disclosure, each first strip sensing electrode 110 is electrically connected with each other, and each second strip sensing electrode 130 is electrically disconnected with each other. However, it is not limited to the present and a part of the first strip sensing electrodes 110 or a part of the second strip sensing electrodes 130 may be electrically connected to meet design requirement. Since each first strip sensing electrode 110 and each second strip sensing electrode 130 in accordance with the present embodiment are respectively connected with corresponding first wires 180A and second wires 180B, the design and manufacture of connecting wires and insulating materials between each sensing electrode can be omitted and the touch panel 100 of the present embodiment can be completed by two-time film-forming process and two-time corresponding photolithography etching process so that the manufacturing method is simplified and the manufacturing cast is reduced.

In another embodiment of the present disclosure, lengths of the adjacent first strip sensing electrodes 110 in the second direction Y are different from each other and the lengths of the adjacent second strip sensing electrodes 110 in the second direction Y are different from each other. For example, as shown in FIG. 3, the first strip sensing electrodes 110 may include a first strip sensing electrode 111, a first strip sensing electrode 112, a first strip sensing electrode 113, a first strip sensing electrode 114 and a first strip sensing electrode 115 with different lengths. And the second strip sensing electrodes 130 may include a second strip sensing electrode 131, a second strip sensing electrode 132, a second strip sensing electrode 133, a second strip sensing electrode 134 and a second strip sensing electrode 135 with different lengths. The length L112 of the first strip sensing electrode 112 is roughly greater than the length L111 of the first strip sensing electrode 111, and the length L132 of the second strip sensing electrode 132 is roughly greater than the length L131 of the second strip sensing electrode 131.

In another embodiment of the present disclosure, a touch panel 100 may include a sensing combination region S1, a sensing combination region S2, a sensing combination region S3, and a sensing combination region S4, which may respectively include a plurality of adjacently aligned strip sensing regions R. In the sensing combination region S1, lengths of first strip sensing electrodes 110 can be digressive along the second direction Y and lengths of second strip sensing electrodes 130 can be progressive along the second direction Y. More specifically in the sensing combination region S1, length of the first strip sensing electrode 115 may be greater than the length of the first strip sensing electrode 114, length of the first strip sensing electrode 114 may be greater than the length of the first strip sensing electrode 113, length of the first strip sensing electrode 113 may be greater than the length of the first strip sensing electrode 112, and length of the first strip sensing electrode 112 may be greater than the length of the first strip sensing electrode 111.

Accordingly, in the sensing combination region S1, length of the second strip sensing electrode 135 may be less than the length of the second strip sensing electrode 134, length of the second strip sensing electrode 134 may be less than length of the second strip sensing electrode 133, length of the second strip sensing electrode 133 may be less than length of the second strip sensing electrode 132, and length of the second strip sensing electrode 132 may be less than length of the second strip sensing electrode 131. It would be appreciated that lengths of the first strip sensing electrodes 110 and the second strip sensing electrodes 130, in each strip sensing region R of the present embodiment, can be complementary to each other, namely, and the situation, length L112 of the first strip sensing electrode 112 is greater than length L111 of the first strip sensing electrode 111 and length L132 of the second strip sensing electrode 132 is less than length L131 of the second strip sensing electrode 131, wherein sum of lengths of the first strip sensing electrode 111 and the second strip sensing electrode 131 in the same strip sensing region R may be roughly equal to sum of lengths of the first strip sensing electrode 112 and the second strip sensing electrode 133 in another strip sensing region R.

In another embodiment of the present disclosure, length distributions of each first strip sensing electrode 110 and each second strip sensing electrode 130 in sensing combination region S1, sensing combination region S2, and sensing combination region S3 are similar to each other. However, the present disclosure is not limited to the present and length distribution condition of each first strip sensing electrode 110 and each second strip sensing electrode 130 in each sensing combination region can be adjusted as per requirement. Moreover, in another embodiment of the present disclosure, lengths of each first strip sensing electrode 110 can also be in a progressive relationship along the second direction Y, and the lengths of each second strip sensing electrode 130 can be in a digressive relationship along the second direction Y. According to the foregoing, with length collocations of each strip sensing electrode, it is possible to achieve touch sensing recognition effect for different regions.

Figure 5:
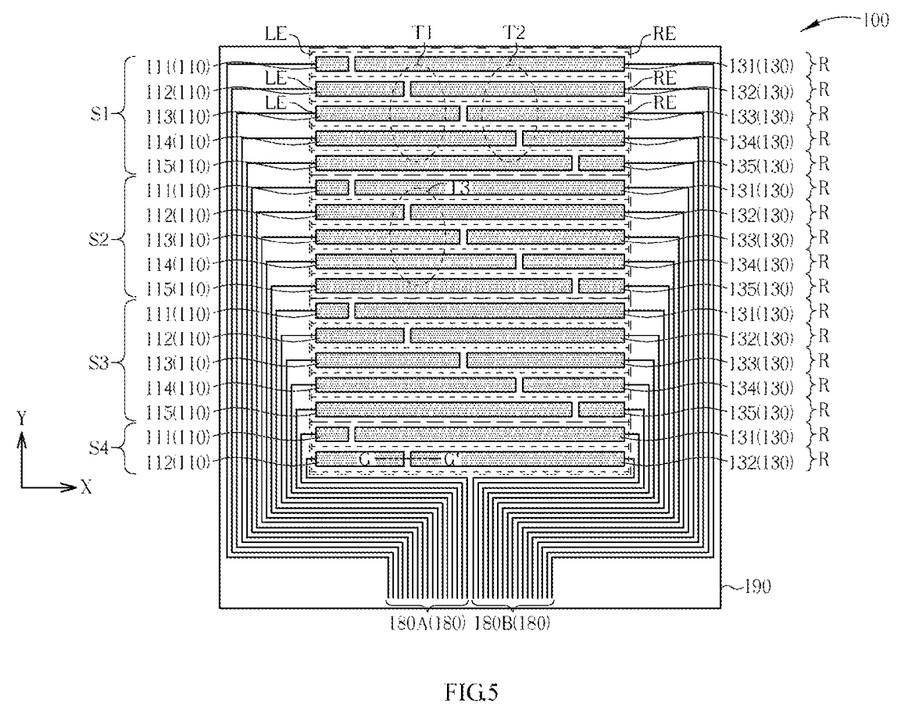
FIG. 5 illustrates a diagram of a touch panel according to another embodiment of the present disclosure.

With reference to FIG. 5, FIG. 5 illustrates a diagram of a touch panel 100 according to another embodiment of the present disclosure. As shown in FIG. 5, the touch panel 100 of the present disclosure includes a substrate 190, a plurality of first sensing electrodes 110, and a plurality of second strip sensing electrodes 130. The first strip sensing electrodes 110 and the second strip sensing electrodes 130 are disposed on the substrate 190. A plurality of strip sensing regions R with fixed lengths is distributed over the substrate 190. The strip sensing regions R extend along a first direction X, and the adjacent strip sensing regions R are aligned along a second direction Y. Each of the strip sensing regions R has a first terminal LE and a second terminal RE that corresponds to the first terminal LE. The first strip sensing electrodes 110 are respectively disposed on the first terminal LE of each strip sensing regions R, and the second strip sensing electrodes 130 are respectively disposed on the second terminal LE of each strip sensing regions R. In other words, the first strip sensing electrodes 110 are respectively correspondingly disposed in each strip sensing regions R with fixed length, and the second strip sensing electrodes 130 are disposed in each strip sensing region R and corresponding to each first strip sensing electrode 110. The first strip sensing electrode 110 and the second strip sensing electrode 130 in each strip sensing region R are adjacently disposed, and each first strip sensing electrode 110 and each second strip sensing electrode 130 are electrically separated from each other. Be noted It can be noted that in the present embodiment that a length of each adjacent first strip sensing electrode 110 in the second direction Y is different from each other, and a length of each adjacent second strip sensing electrode 130 in the second direction Y is different from each other. Moreover each of the first strip sensing electrodes 110 can extend from the first terminal LE forward toward the second terminal RE of each of the strip sensing regions R, and each of the second strip sensing electrodes 130 can extend from the first terminal LE forward toward the second terminal RE of each of the strip sensing regions R. In an embodiment of the present disclosure, the touch panel 100 further includes a sensing combination region S1, a sensing combination region S2, a sensing combination region S3 and a sensing combination region S4, which respectively include a plurality of adjacently aligned strip sensing regions R. In the sensing combination region S1, length of each first strip sensing electrode 110 may be in a digressive relationship along the second direction Y, and length of each second strip sensing electrode 130 may be in a progressive relationship along the second direction Y. The sum of lengths of the first strip sensing electrode 110 and the second strip sensing electrode 130 in the same strip sensing region R may be roughly equal to the sum of lengths of the first strip sensing electrode 110 and the second strip sensing electrode 130 in another strip sensing region R. Namely, each of the second strip sensing electrodes 130 and the corresponding first strip sensing electrodes 100 are electrically disconnected from each other and lengths thereof are complementary to each other. In addition, touch panel 100 of the present disclosure may further include a plurality of first wires 180A and a plurality of second wires 180B, Wherein each first wire 180A is electrically connected to each first strip sensing electrode 110 on the first terminal LE of each of the strip sensing region R, and each second wire 180B is electrically connected to each second strip sensing electrode 130 on the second terminal RE of each strip sensing region R. Configuration changes and material properties of each component of the touch panel 100, according to the present embodiment, are already described in the above disclosed method for manufacturing the touch panel of and therefore not described here again.

In an embodiment, in the setting modes and length collocations of each first strip sensing electrode 110 and each second strip sensing electrode 130 of the touch panel 100, according to the present embodiment, it is possible to achieve touch sensing recognition effect for different regions. As shown in FIG. 5, when a touch point T1 and a touch point T2 are touched, although the touch point T1 and the touch point T2 are both in the sensing combination region S2, difference between the touch point T1 and the touch point T2 can be judged based on the signal representing change in capacitance of each first strip sensing electrode 110 and each second strip sensing electrode 130, wherein the change in capacitance is due to difference in length collocations of the first strip sensing electrode 110 and the second strip sensing electrode 130 in each strip sensing region R of the sensing combination region S1. More specifically, when the touch point T1 is touched, capacitance effect of forgoing sensing electrodes is affected as the touch point T1 covers the first strip sensing electrode 112, the first strip sensing electrode 113, the first strip sensing electrode 114, the first strip sensing electrode 115, the second strip sensing electrode 131, and the second strip sensing electrode 132 in the sensing combination region S1. On the other hand, when the touch point T2 is touched, capacitance effect of forgoing sensing electrodes would be affected as the touch point T2 covers the second strip sensing electrode 131, the second strip sensing electrode 132, the second strip sensing electrode 133, the second strip sensing electrode 133, the first strip sensing electrode 114, and the first strip sensing electrode 115 in the sensing combination region S1. In other words, length collocation of the first strip sensing electrodes 110 and the second strip sensing electrodes 130 in each strip sensing region R are changed so that position changes of the touch point T1 and the touch point T2 in the first direction X can be recognized by judging the difference between affected first strip sensing electrodes 110 and second strip sensing electrodes 130. In addition, when the touch point T3 has being touched, position changes of the touch point T3 and the touch point T1 in the second direction Y can be recognized by judging the capacitance effects caused to different first strip sensing electrodes 110 and second strip sensing electrodes 130 in the second direction Y. Accordingly multi-point touch recognition effect can be achieved under the sensing electrodes design of the touch panel 100 of the present embodiment.

Figure 6:
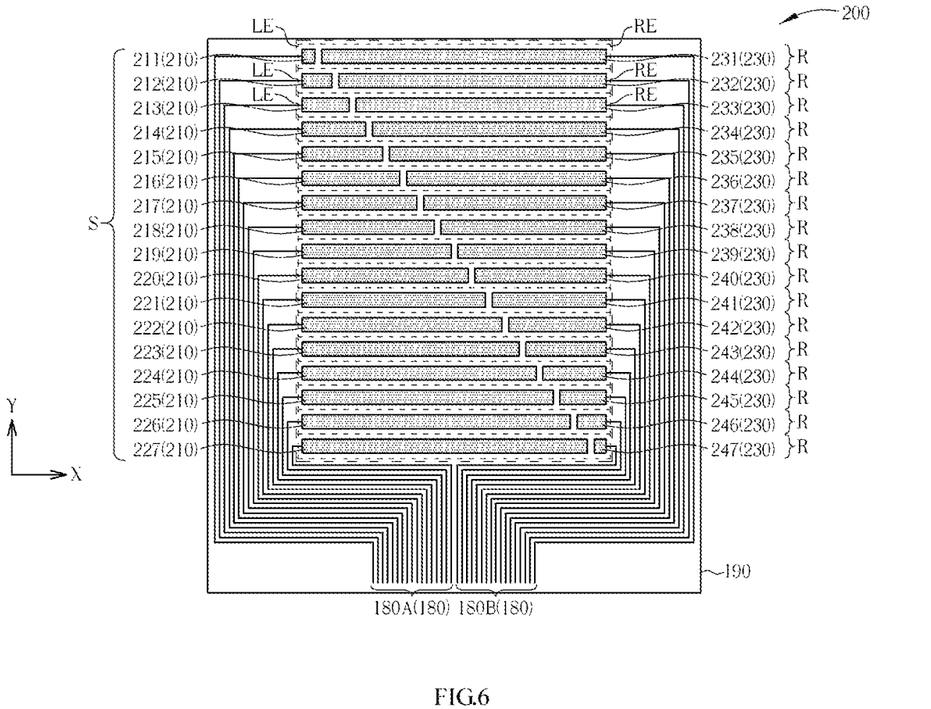
FIG. 6 illustrates a diagram of a touch panel according to yet another embodiment of the present disclosure.

FIG. 6 illustrates a diagram of a touch panel according to another embodiment of the present disclosure. As shown in FIG. 6, difference between the touch panel 200 of the present embodiment and foregoing touch panel 100 is that the touch panel 200 of the present embodiment includes a sensing combination region S. In the sensing combination region S, the first strip sensing electrode 227, the first strip sensing electrode 226, the first strip sensing electrode 225, the first strip sensing electrode 224, the first strip sensing electrode 223, the first strip sensing electrode 222, the first strip sensing electrode 221, the first strip sensing electrode 220, the first strip sensing electrode 219, the first strip sensing electrode 218, the first strip sensing electrode 217, the first strip sensing electrode 216, the first strip sensing electrode 215, the first strip sensing electrode 214, the first strip sensing electrode 213, the first strip sensing electrode 212, and the first strip sensing electrode 211 are aligned along the second direction Y, and lengths thereof are in a digressive relationship. Further the second strip sensing electrode 247, the second strip sensing electrode 246, the second strip sensing electrode 245, the second strip sensing electrode 214, the second strip sensing electrode 243, the second strip sensing electrode 242, the second strip sensing electrode 241, the second strip sensing electrode 240, the second strip sensing electrode 239, the second strip sensing electrode 238, the second strip sensing electrode 237, the second strip sensing electrode 236, the second sensing electrode 235, the second strip sensing electrode 234, the second strip sensing electrode 233, the second strip sensing electrode 232 and the second strip sensing electrode 231 are aligned along the second direction Y, and lengths thereof are in a progressive relationship. In the touch panel 200 of the present embodiment, except for the length collocation of each first strip sensing electrode 210 and each second strip sensing electrode 230, component characteristics and material properties are similar to those of the touch panel 100 of foregoing embodiment and thus not described here again. It would be appreciated that since the touch panel 200 of the present embodiment only includes a sensing combination region S, touchable recognition region in the first direction X would focus nearby a diagonal on the panel and is different from the distribution condition of the touchable recognition region of the touch panel 100 in foregoing embodiment so that the length changes of each first strip sensing electrode and each second strip sensing electrode can adjust based on the application scope of the touch panel.

Figure 7:
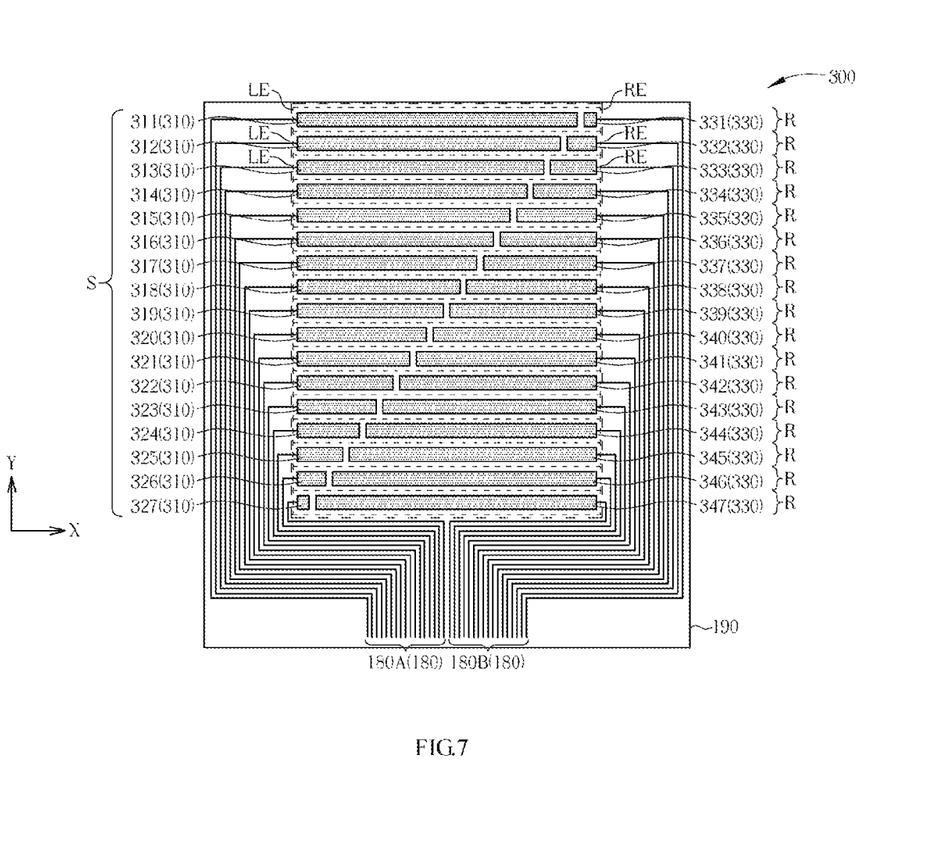
FIG. 7 illustrates a diagram of a touch panel according to another embodiment of the present disclosure.

FIG. 7 illustrates a diagram of a touch panel according to an embodiment of the present disclosure. Difference between the touch panel 300 of the present embodiment and foregoing touch panel 200 is that in the sensing combination region S of the present embodiment, the first strip sensing electrode 327, the first strip sensing electrode 326, the first strip sensing electrode 325, the first strip sensing electrode 324, the first strip sensing electrode 323, the first strip sensing electrode 322, the first strip sensing electrode 321, the first strip sensing electrode 320, the first strip sensing electrode 319, the first strip sensing electrode 318, the first strip sensing electrode 317, the first strip sensing electrode 316, the first strip sensing electrode 315, the first strip sensing electrode 314, the first strip sensing electrode 313, the first strip sensing electrode 312, and the first strip sensing electrode 311 are aligned along the second direction Y, and lengths thereof are in a progressive relationship. Furthermore, the second strip sensing electrode 347, the second strip sensing electrode 346, the second strip sensing electrode 345, the second strip sensing electrode 341, the second strip sensing electrode 343, the second strip sensing electrode 342, the second strip sensing electrode 341, the second strip sensing electrode 340, the second strip sensing electrode 339, the second strip sensing electrode 338, the second strip sensing electrode 337, the second strip sensing electrode 336, the second sensing electrode 335, the second strip sensing electrode 334, the second strip sensing electrode 333, the second strip sensing electrode 332, and the second strip sensing electrode 331 are aligned along the second direction Y, and lengths thereof are in a digressive relationship. In the touch panel 300 of the present embodiment, except for the length collocation of each first strip sensing electrode 310 and each second strip sensing electrode 330, component characteristics and material properties thereof are similar to those of the touch panel 300 of foregoing embodiment and thus not described here again.

To sum up, touch panel of the present disclosure utilizes length changes and collocation of each strip sensing electrode pattern to achieve required touch orientation effect under the needless situation of connecting each sensing electrode in serial. In addition, the method of manufacturing the touch panel of the present disclosure can also achieve the purpose of simplifying the manufacturing process by avoiding forcing the connecting wires between each sensing electrode and further avoiding the design and manufacture of insulating materials.

Foregoing descriptions are the preferred embodiments of the present disclosure. However, all equivalent changes and modifications may be made thereto based on the claims and descriptions of the present disclosure, which are intended to be defined by the appended claims.

What is claimed is:

1. A touch panel having at least one sensing region, comprising:
    a plurality of electrodes substantially distributed in the entire sensing region; wherein each of the electrodes comprises:
    a first strip sensing segment;
    a second strip sensing segment, wherein the second strip sensing segment corresponds to the first strip sensing segment, and wherein the second strip sensing segment and the corresponding first strip sensing segment are electrically disconnected from each other; and
    a plurality of first wires and a plurality of second wires, wherein each of the first wires is electrically connected to the corresponding first strip sensing segment, and each of the second wires is electrically connected to the corresponding second strip sensing segment, such that signals representing change in capacitance of each first strip sensing segment and each second strip sensing segment are judged to recognize a position of touch point, wherein all the electrodes in the sensing region are sensing electrodes, and each of the electrodes outputs sensing signal representing a change in capacitance thereof upon touch, and wherein the sensing region has a fixed length, wherein each of the electrodes includes exactly two strip sensing segments including the first strip sensing segment and the second strip sensing segment, and wherein lengths of the first strip sensing segment and the second strip sensing segment are complementary to each other with respect to the fixed length.

2. The touch panel of claim 1, further comprising a substrate, wherein the first strip sensing segment and the second strip sensing segment are disposed on the substrate.

3. The touch panel of claim 1, wherein lengths of the first strip sensing segments of the adjacent sensing electrodes are different from each another, and wherein lengths of the second strip sensing segments of the adjacent sensing electrodes are different from each other.

4. The touch panel of claim 1, wherein lengths of the first strip sensing segments have progressive or digressive relationship, and wherein lengths of the second strip sensing segments have progressive or digressive relationship.

5. The touch panel of claim 3, wherein the plurality of electrodes form a plurality of adjacently aligned sensing combination regions.

6. The touch panel of claim 5, wherein in one of the sensing combination regions, lengths of the first strip sensing segments have progressive or digressive relationship, and wherein lengths of the second strip sensing segments have progressive or digressive relationship.

7. The touch panel of claim 5, wherein sum of the lengths of the first strip sensing segment and the corresponding second strip sensing segment in one of the sensing combination regions is equal to sum of the lengths of the first strip sensing segment and the corresponding second strip sensing segment in the adjacent sensing combination region.

8. A method for manufacturing a touch panel, comprising:
providing a substrate having at least one sensing region thereon;
forming a plurality of electrodes substantially distributed in the entire sensing region, wherein all the electrodes in the sensing region are sensing electrodes, and each of the electrodes outputs sensing signal representing a change in capacitance thereof upon touch; and wherein each of the electrodes comprises:
a first strip sensing segment and a second strip sensing segment, wherein the second strip sensing segment corresponds to the first strip sensing segment, and the second strip sensing segment and the corresponding first strip sensing segment are electrically disconnected from each other; and
forming a plurality of first wires and a plurality of second wires, wherein each of the first wires is electrically connected to the corresponding first strip sensing segment, and each of the second wires is electrically connected to the corresponding second strip sensing segment such that signals representing change in capacitance of each first strip sensing segment and each second strip sensing segment are judged to recognize a position of touch point, and wherein the sensing region has a fixed length, wherein each of the electrodes includes exactly two strip sensing segments including the first strip sensing segment and the second strip sensing segment, and wherein lengths of the first strip sensing segment and the second strip sensing segment are complementary to each other with respect to the fixed length.

9. The method for manufacturing the touch panel of claim 8, wherein lengths of the first strip sensing segments of the adjacent sensing electrodes are different from each another, and wherein lengths of the second strip sensing segments of the adjacent sensing electrodes are different from each other.

10. The method for manufacturing the touch panel of claim 8, wherein lengths of the first strip sensing segments have progressive or digressive relationship, and wherein lengths of the second strip sensing segments have progressive or digressive relationship.

11. The method for manufacturing the touch panel of claim 8, wherein the plurality of electrodes form a plurality of adjacently aligned sensing combination regions.

12. The method for manufacturing the touch panel of claim 11, wherein in one of the sensing combination regions, lengths of the first strip sensing segments have progressive or digressive relationship, and wherein lengths of the second strip sensing segments have progressive or digressive relationship.

13. The method for manufacturing the touch panel of claim 8, wherein the first strip sensing segment and the second strip sensing segment are formed simultaneously by same pattern process.

14. The method for manufacturing the touch panel of claim 8, wherein the first strip sensing segment and the second strip sensing segment are formed by different pattern processes.

15. The method for manufacturing the touch panel of claim 11, wherein sum of the lengths of the first strip sensing segment and the corresponding second strip sensing segment in each sensing combination region is equal to sum of the lengths of the first strip sensing segment and the corresponding second strip sensing segment in the adjacent sensing combination region.

16. The touch panel of claim 1, wherein the first wires and the second wires are made of transparent conducting materials or opaque conducting materials.

17. A touch panel, comprising:
a substrate having a sensing region;
a plurality of electrodes substantially distributed in the entire sensing region; wherein each of the electrodes comprises a first strip sensing segment and a second strip sensing segment, wherein a gap portion is formed between the first strip sensing segment and the second strip sensing, and wherein all the electrodes in the sensing region are sensing electrodes and each of the electrodes outputs sensing signal representing a change in capacitance thereof upon touch; and
a plurality of peripheral wires connected to the first strip sensing segment and the second strip sensing segment, and
wherein the sensing region has a fixed length, wherein each of the electrodes includes exactly two strip sensing segments including the first strip sensing segment and the second strip sensing segment, and wherein lengths of the first strip sensing segment and the second strip sensing segment are complementary to each other with respect to the fixed length.

* * * * *